UNITED STATES PATENT OFFICE.

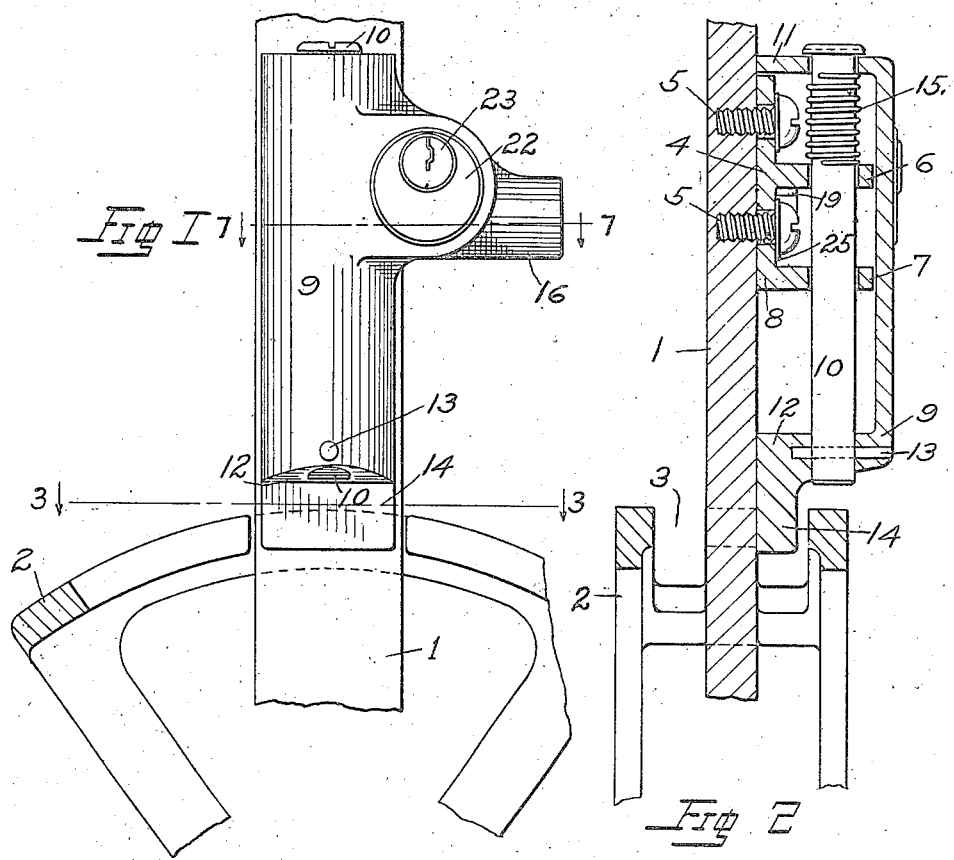

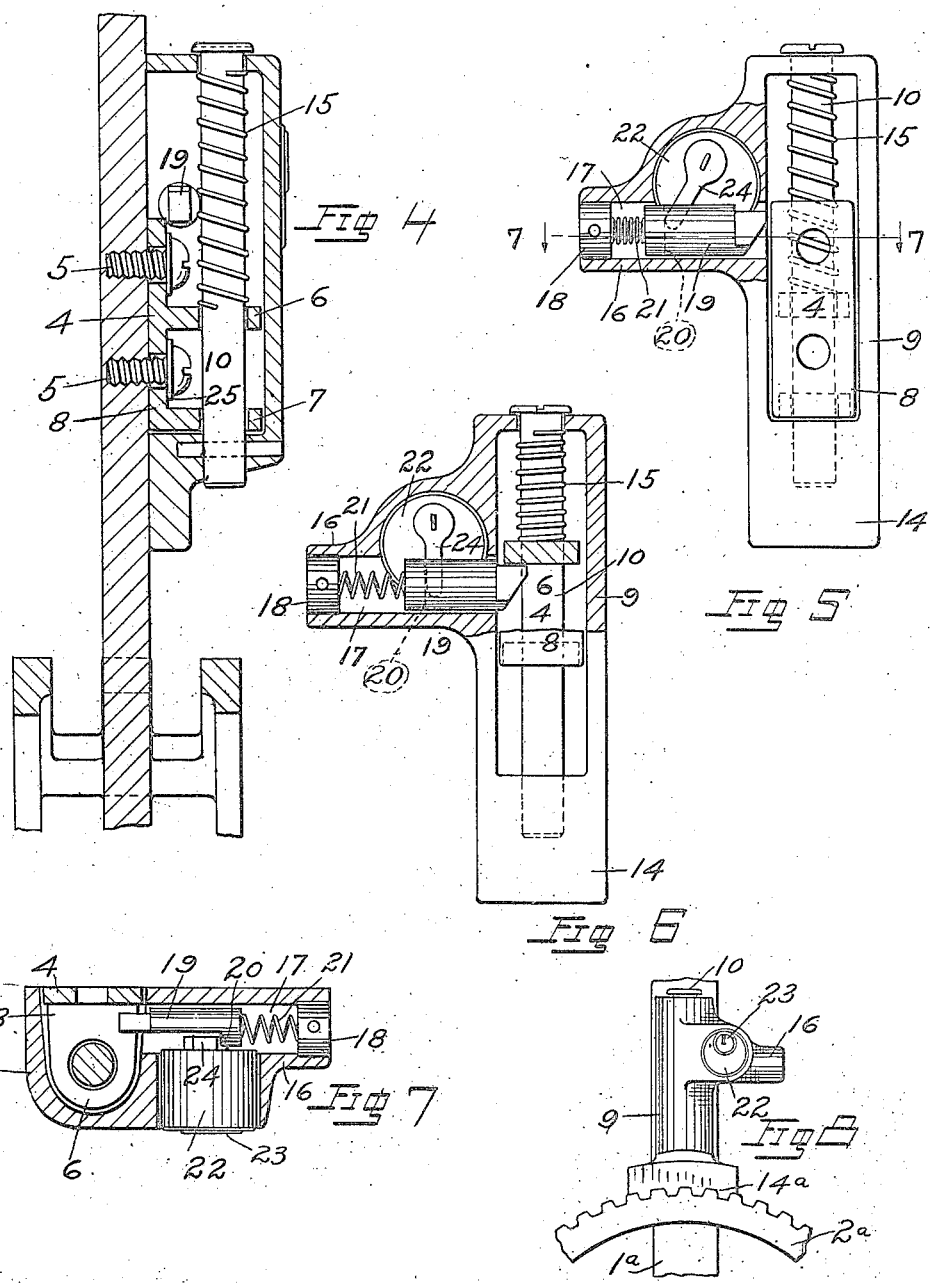

CHARLES R. SAUNDERS, OF LAKEWOOD, OHIO.

LEVER-LOCKING DEVICE.

1,167,600. Specification of Letters Patent. Patented Jan. 11, 1916.

Application filed June 2, 1913. Serial No. 771,222.

*To all whom it may concern:*

Be it known that I, CHARLES R. SAUNDERS, a citizen of the United States, residing at Lakewood, in the county of Cuyahoga and State of Ohio, have invented a certain new and useful Improvement in Lever-Locking Devices, of which the following is a full, clear, and exact description, reference being had to the accompanying drawings.

This invention relates generally to locks for levers of various kinds, such, for instance, as the gear shifting levers of automobiles, the throttle levers of locomotives, the controller levers of electric railway cars, or the brake levers of vehicles; and, while the lock is adaptable to all of the foregoing types of levers, it is to a lock for the first mentioned class of levers that my invention particularly relates and to which this application has special reference.

The objects of my invention are to provide a lock of the above class which is very strong, yet simple of construction and economical of production; which may be quickly and easily attached to various forms of levers, which is adaptable to practically all standard makes of automobiles; a lock wherein the means of attachment are concealed and protected when the lock is secured to its lever; and a lock which is neat and attractive in appearance and which may be very conveniently operated to lock the lever.

The object of my invention, more broadly stated, is to provide means for locking the gear shifting lever of an automobile in ineffective position in order to protect the automobile against being stolen or tampered with, and the invention may be defined, generally, as consisting of the combinations of elements set forth in the annexed claims and shown in the accompanying drawings which illustrate the preferred embodiment thereof and wherein—

Figure 1 is a side elevation of my lock applied to the gear shifting lever of an automobile, only a portion of the lever being shown in said figure, the view of the sector or gate coöperating therewith corresponding to the line 1—1 of Fig. 3; Fig. 2 is a central vertical section through the parts shown in Fig. 1; Fig. 3 is a horizontal section on the line 3—3 of Fig. 1 and looking in the direction of the arrows; Fig. 4 is a view, similar to Fig. 2, and showing the parts in unlocked position; Figs. 5 and 6 are views of the lock removed from the lever, and showing the side ordinarily covered by the lever when the lock is attached thereto, a portion of each of the views being broken away to disclose the latch mechanism; Fig. 7 is a sectional detail on the line 7—7 of Figs. 1 and 5; and Fig. 8 represents a side elevation of a modified form of my lock.

Describing my invention by the use of reference characters, similar ones being used to designate corresponding parts throughout the several views of the drawings, 1 represents the gear shifting lever of an automobile and 2 the sector or gate which guides it in its movements. As will be seen clearly from Fig. 3, the slot 3 in the gate or sector 2 is H-shaped, and the cross of the H represents the space occupied by the lever 1 when the same is in neutral or "dead" position. A lateral shifting of the lever from this position will not effect the engagement of the gears, but any movement in either direction from this central position will throw the gears into mesh and make it possible to run the automobile, three of the branches of the slot representing slow, medium and high speed forward, respectively, while the other branch represents the low speed reverse. To protect the automobile against being run, therefore, it is only necessary to secure the lever 1 against movement in either direction from the central position, and for this purpose I provide the form of lock which I will now proceed to describe. Preferably to that side of the lever 1 which faces toward the driver's position, I secure a plate 4 by means of screws 5, the screws passing only part way through the lever 1 to protect them against being tampered with, which would be possible if the screws or the holes therefor extended entirely through the lever. Extending from the side of the plate 4 opposite the lever 1, are vertically spaced lugs 6 and 7, the former of which projects from the central portion of the plate and the latter from its lower edge. The lugs 6 and 7 and the plate 4 are preferably cast integral and, together, comprise what I will refer to hereinafter as the stationary member of my lock, and which I will designate 8.

A sliding member 9, which is made in the form of a casing and surrounds the stationary member 8, is secured to the former member by a rod 10 which passes through a hole in the top wall 11 of the member 9, through holes in the members 6 and 7 which are in axial alinement with the first mentioned hole, and terminates in a hole formed in the bottom wall 12 of the sliding member 9 where it is secured in place by a pin 13 which, after being driven in place, is smoothed off flush with the surface of the member 9 and finished in a manner to conceal its identity,—a method which is referred to in mechanics as "blind pinning". Depending from the lower end of the sliding member 9 is a lug 14 which is of a thickness somewhat less than the width of the branches of the slot 3. This lug is adapted to be projected into the slot 3 when the members are in locked position, as shown in Figs. 1, 2, and 3. A comparatively heavy coil spring 15 surrounds the upper end of the bolt 10 and is confined between the inner surface of the top wall 11 of the movable member 9 and the adjacent wall of the lug 6 of the stationary member 8. This spring tends to elevate the member 9, or in other words, to return the parts to unlocked or normal position when they are released by the latch, which I will now describe.

Projecting from one side of the sliding member or casing 9, near its upper end, is a cylindrical boss 16 having a longitudinal bore 17 which opens into the interior of the casing 9 at its inner end and which is closed at its outer end by a plug 18 which is "blind pinned" in position. Adapted to slide within the bore 17 is a bolt of plunger 19 which is generally cylindrical in shape but has the greater part of one of its sides cut away to provide a space, for a purpose which will be mentioned hereinafter and which results in the formation of a shoulder 20. A compression spring 21 is confined between the plug 18 and the near end of the plunger 19, and the opposite end of the plunger is flattened on its upper edge and has its lower edge inclined or tapered upwardly to form the nose of a latch for coöperation with the lug 6 of the stationary member 8 of the lock.

An enlargement of the boss 16, which is located intermediate the outer end of said boss and its junction with the member 9, is provided with a transverse cylindrical bore for the accommodation of a lock 22 of the "Yale" type, which I have shown in my drawings only in a general way, it being deemed unnecessary to illustrate it further, since such locks are common and can be secured on the market under the name here given. The barrel of the lock is indicated at 23, and has secured to its rear end a finger 24 which occupies the space in advance of the shoulder 20 of the plunger 19 and is adapted to coöperate with said shoulder.

In attaching my lock to a lever, the stationary member 8 thereof is first secured to the lever by the screws 5, split washers 25 of ordinary type being used between the heads of the screws and the adjacent wall of the plate 4 to prevent the member 8 from becoming loosened through the jarring of the vehicle. The sliding member or casing 9 is then placed over the stationary member and the spring 15 is inserted between its upper wall and the lug 6 of the stationary member, the upper end of the sliding member or casing being tilted away from the lever a sufficient distance to permit of such insertion. The rod 10 is then inserted through the alining holes in the two members of the lock and through the spring 15 and is secured in position by the pin 13 which is smoothed off and finished after it is inserted for the purpose of concealing its presence, as hereinbefore mentioned.

When the driver desires to lock his car, he throws the gear shifting lever in neutral or dead position, as illustrated in Fig. 3, and, placing his foot upon the top of the movable member 9 of the lock, presses it downwardly until the nose of the plunger 19 rides over the adjacent edge of the lug 6 and snaps thereunder through the influence of the spring 21. This operation projects the lug 14 into the slot 3, and since the aggregate thickness of the lever 1 and the lug 14 is greater than the width of the branches of the slot 3 all but a very slight lateral movement of the lever 1 is effectively prevented. To unlock the parts, an appropriate key is inserted into the key hole of the lock 22 whereby the barrel 23 thereof may be rotated. Upon such rotation of the barrel 23, the finger 24 which is secured to its rear end, engages the shoulder 20 of the plunger 19 and moves it against the tension of the spring 21, out of engagement with the lug 6, thus permitting the sliding member 9 of the lock to rise under the action of the spring 15 and withdraw the lug 14 from the slot 3.

From the foregoing description it will be seen that I have provided a simple and substantial mechanism for securely locking the gear shifting lever of an automobile in the neutral or "dead" position within its gate or sector, and which requires the use of a key only for the purpose of unlocking it, it being locked by the simple operation of pressing it downwardly into effective position wherein it is securely held against displacement.

In Fig. 8 I have shown a modified form of my lock that is adapted for use with levers which are not laterally shiftable, but which may be locked in any angular position by the coöperation of the toothed face of the lug 14$^a$ of the lock with the complementary face of a stationary sector 2ª, the remainder of the lock being identical with that previously described.

Having thus described my invention, what I claim is:—

1. In a device of the character set forth, the combination, with a base, of a casing reciprocably mounted thereon, means normally holding the casing near one of the limits of its movement with respect to said base, a guideway carried by the casing, a bolt in said guideway adapted to engage said base to retain the casing near its other limit of movement, and means carried by the casing for releasing said bolt.

2. In a device of the character set forth, the combination, with a base, of a casing reciprocably mounted on said base, means normally holding the casing away from the coöperating object, said casing being provided with a transverse bore, a bolt or plunger slidably mounted in said bore and adapted to engage a portion of the base to retain the casing in operative relation to such object, a spring for forcing said bolt or plunger toward the coöperating part of the base, and a lock comprising a rotatable barrel having a projection adapted to engage the bolt or plunger to withdraw it from engagement with the coöperating portion of the base.

3. In a device of the character set forth, the combination, with a base or support, of a locking member reciprocably mounted on the base or support and having a lug or extension, a spring adapted to move the locking member in one direction, a projection carried by the base or support, a bolt carried by the locking member and adapted to engage such projection and to hold the locking member in locking relation to its coöperating object, and means for retracting said bolt.

4. In a device of the character set forth, the combination, with a base having a lateral projection, of a casing reciprocably mounted on said base, a bolt in said casing extending through said projection and guiding the casing on said base, a spring surrounding the bolt and engaging said projection and a portion of the casing and tending to move the casing away from the coöperating object, a locking lug or extension carried by the casing and adapted to engage such object, a bolt carried by the casing and adapted to engage the projection, a spring tending to move the bolt toward the projection, and means for retracting said bolt.

5. In a device of the character set forth, the combination, with a supporting base, of a casing slidably mounted on said base, a spring within the casing adapted to move the same away from its coöperating object, said casing having a lug or extension adapted to engage the said object, a lock carried by the casing and comprising a rotary barrel, a finger projecting from the barrel, a bolt within the casing adapted to be engaged by said finger, a projection carried by the base to retain the casing in engagement with said object, and a spring pressing the bolt toward said projection.

6. In a device of the character set forth, the combination, with a base plate having a pair of projections, of a bolt slidably mounted in said projections, a casing rigidly connected with said bolt and having a locking portion, a spring within the casing and interposed between one of the said projections and the casing and tending to hold the casing out of engagement with the coöperating object, a bolt mounted within the casing, a spring within the casing pressing said bolt toward one of said projections, and means for retracting said bolt.

7. In a device of the character set forth, the combination, with a supporting base, of a casing reciprocably mounted on said base, a spring within the casing and normally holding the same out of engagement with a coöperating object, a bolt carried by the casing adapted to engage a projection of the base when the said casing is in operative relation to said object, a spring within the casing tending to move the bolt into base-engaging position, and means within the casing for retracting said bolt.

8. The combination, with a base having one or more projections, of a bolt slidably mounted in said projection or projections, a casing carried by the bolt and surrounding and inclosing the base, a spring surrounding the bolt and bearing against a projection of the base and the casing, a bolt within the casing adapted to engage a projection when the casing is moved against the action of the spring, and means for retracting said bolt.

9. The combination, with a base, of a bolt reciprocably mounted in said base, a casing secured to said bolt, a spring surrounding the bolt and bearing at one end against the base and at its other end against the casing, means for holding the casing in operative relation to the object to be locked, and a releasing device for the last mentioned means.

10. The combination of a locking block adapted to be slidably mounted on a lever, a lock mounted in the block and movable therewith and having a part engageable with the lever to hold the block against movement, and a spring pressing on said block and tending to move the same to unlocked position when said part is disengaged.

11. The combination of a plate adapted to be secured to a lever and having a projection, a hollow block slidable up and down on the plate, into and out of locking position, and into the hollow of which the projection extends, a spring between said projection and the block, tending to lift the latter, and a lock mounted in the hollow of the block and having a locking member engageable with said projection to prevent movement of the block.

In testimony whereof, I hereunto affix my signature in the presence of two witnesses.

CHARLES R. SAUNDERS.

Witnesses:
 JOHN B. HULL,
 HUGH B. McGILL.